United States Patent [19]

Inskip

[11] 4,210,705
[45] Jul. 1, 1980

[54] POLYVINYL BUTYRAL COMPOSITIONS

[75] Inventor: Harold K. Inskip, Newark, Del.

[73] Assignee: E. I. Du Pont de Nemours and Company, Wilmington, Del.

[21] Appl. No.: 35,644

[22] Filed: May 3, 1979

Related U.S. Application Data

[62] Division of Ser. No. 874,612, Feb. 2, 1978.

[51] Int. Cl.$^2$ .................. B32B 27/00; D01F 1/02
[52] U.S. Cl. .................. 428/500; 156/106; 264/211; 427/430.1; 428/432; 428/437; 428/539; 428/911
[58] Field of Search .............. 428/500, 432, 437, 539, 428/911; 156/106; 260/31.2 R; 264/211; 427/430 R

[56] References Cited

U.S. PATENT DOCUMENTS

| | | | |
|---|---|---|---|
| 3,249,487 | 5/1966 | Buckley et al. | 528/437 |
| 3,434,915 | 3/1969 | Garrison | 528/215 |
| 3,556,890 | 1/1971 | Buckley et al. | 156/106 |
| 3,762,981 | 10/1973 | Blank | 156/106 X |
| 3,838,091 | 9/1974 | Kanno et al. | 260/31.2 R |
| 3,855,055 | 12/1974 | Kanno et al. | 528/437 |
| 4,020,217 | 4/1977 | Karasudani et al. | 428/432 X |

OTHER PUBLICATIONS

English translation of French Pat. No. 2,263,203 Published Oct. 3, 1975, 27 pages.

*Primary Examiner*—Thomas J. Herbert, Jr.

[57] ABSTRACT

Plasticized polyvinyl butyral resins having improved impact resistance in glass laminates through the incorporation of metal salts of neo decanoic acid.

3 Claims, No Drawings

POLYVINYL BUTYRAL COMPOSITIONS

This is a division of application Ser. No. 874,612 filed Feb. 2, 1978.

BACKGROUND OF THE INVENTION

Polyvinyl butyral sheeting has long been used as an interlayer in safety glass laminates. These laminates are commonly used not only in architectural but in automotive applications, where they serve a dual function of protecting persons inside a car from being struck by flying objects from the outside and preventing the occupants from penetrating the windshield on impact after a sudden stop.

Particularly in automotive applications, the adhesion of the polyvinyl butyral sheeting to the glass components must be carefully controlled to provide a balance between maintaining the integrity of the windshield on impact and cushioning the impact through energy absorption. Many adhesion control agents have been used successfully in the past, but often exhibit a moisture sensitivity that can result in marked variation in the desired degree of adhesion of the glass to the interlayer. Accordingly, continuing effort has been directed toward the development of adhesion control agents for polyvinyl butyral sheeting which can be used satisfactorily over a broad range of process conditions.

SUMMARY OF THE INVENTION

The instant invention provides polyvinyl butyral sheeting having incorporated therein an adhesion control agent which provides outstanding performance over a wide variety of process conditions.

Specifically, the instant invention provides an improvement in plasticized polyvinyl butyral sheeting having incorporated therein an adhesion control agent, which improvement comprises an adhesion control agent consisting essentially of about from 0.01–0.5 wt. percent of a divalent metal salt of neo decanoic acid, wherein the metal is selected from the group consisting of magnesium, lead, calcium and zinc.

DETAILED DESCRIPTION OF THE INVENTION

Polyvinyl butyral used in the instant invention is of the type well known to the art. The polyvinyl butyral is generally prepared from polyvinyl alcohol by reaction with n-butyraldehyde. The resulting product is then plasticized for extrusion into a sheet.

In accordance with the present invention, about from 0.01–0.5 wt. percent, based on plasticized polyvinyl butyral, of a divalent metal salt of neo decanoic acid is incorporated into the polyvinyl butyral composition. The neo decanoic acid salt can be readily prepared by bringing into contact, at elevated temperatures, commercially available neo decanoic acid with the hydroxide, acetate or oxide of the desired metal ion, or, alternatively, the metal itself in the presence of a solvent. In general, the magnesium, lead, calcium and zinc salts of neo decanoic acid can be used in the instant invention, and, of these, magnesium neo decanoate has been found to be particularly satisfactory. Magnesium neo decanoate can be prepared by the reaction of about 2 moles of neo decanoic acid with 1 mole of magnesium hydroxide in a solvent such as xylol. The reaction proceeds satisfactorily with moderate heating and removal of the water generated.

The neo decanoic acid salt is used in amounts of about from 0.01–0.5 wt. percent of the plasticized polyvinyl butyral. Less than 0.01 wt. percent provides little recognizable beneficial effect on the glass adhesion of polyvinyl butyral, while quantities in excess of 0.5 wt. percent provide little or no additional benefit.

The neo decanoic acid salt can be incorporated into the polyvinyl butyral resin in any convenient manner. For example, the acid salt can be added to the polyvinyl butyral together with plasticizer prior to extrusion. The lower solubility of the lead and zinc salts of neo decanoic acid make this method of incorporation preferable for these additives. In general, however, it is preferred to immerse preformed plasticized polyvinyl butyral sheeting in a solution of the decanoate in appropriate solvents such as water or hexane. The period of immersion will, of course, depend on the process parameters involved and the concentration of the neo decanoate solution. Immersion in the solution should be for a sufficient period to permit the absorption of the required amount of the neo decanoate onto the polyvinyl butyral sheeting. Typically, immersion for about from five seconds to one minute satisfactorily introduces sufficient neo decanoate salt to polyvinyl butyral sheeting with a 1% solution of magnesium neo decanoate in solvent.

The particular neo decanoate used in the instant invention can be selected from a variety of isomers, to the extent that the compounds are branched at the alpha carbon atom. Thus, representative magnesium decanoates which can be used include:

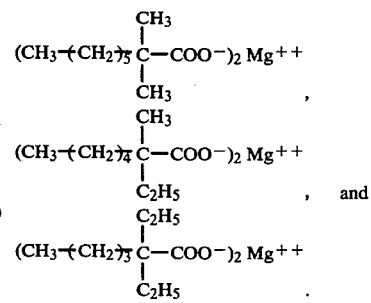

, and

A mixture of all three of the above isomers in the acid form which has been found particularly satisfactory in the instant invention is that commercially available from Exxon Corporation as neo decanoic acid.

The neo decanoates of the present invention provide outstanding adhesion control for polyvinyl butyral sheeting. Surprisingly, the present neo decanoates are superior to straight-chain decanoic acid salts as well as salts of acids having higher and lower molecular weights. Metal salts of organic acids having fewer than 10 carbon atoms generally have been found to exhibit a lower solubility in polyvinyl butyral sheeting, and can be more readily washed from the sheeting with treating solutions. In addition, metal salts having molecular weights higher than neo decanoates fail to modify satisfactorily the adhesion characteristics of the polyvinyl butyral sheeting. The indicated amounts of the metal neo decanoate provide excellent adhesion control over a wide variety of humidity conditions, thus making unnecessary the elaborate humidity controls used with many earlier adhesion control agents.

In those applications where further reduction of adhesion is desired between the polyvinyl butyral sheeting and the glass components of a laminate, the polyvinyl butyral sheeting can further include a nonionic or anionic surfactant. These surfactants are most conveniently added to the solution into which the sheeting is dipped to apply the neo decanoate. The surfactant, when present, is typically used in concentrations of 0.01–1.0% of the dip solution. A wide variety of commercially available surfactants can be used, as are known to those skilled in the art. Typical are sodium lauryl sulfate anionic surfactant available from E. I. du Pont de Nemours and Company in aqueous solution as "Duponol ® WAQE" and octylphenoxy polyethoxy ethanol non-ionic surfactant, available from Rohm and Haas in aqueous solution as "Triton ® X-305."

In the following examples, which further illustrate the present invention, magnesium neo decanoate, unless otherwise noted, was prepared by the following procedure:

In a 2-liter round-bottomed, three-necked flask fitted with a thermometer, a Dean-Stark trap and a paddle agitator was placed 267 g (1.55 moles) of neo decanoic acid obtained through regular commercial sources from Exxon Corporation, 500 ml of xylol and 45.2 g (0.775 moles) of magnesium hydroxide. The mixture was heated with a heating mantle with stirring. As it began to boil and as water began to collect in the trap the vapor temperature rose from about 115° C. to 142° C. It was held there for an hour. About twenty-six cc of water collected in the trap. The mixture was cooled to room temperature, left standing for two hours, then diluted with 500 ml of xylol, and about 60 ml of Celite 300 GM filter aid was added. It was then filtered through a Buchner funnel, and the clear filtrate was distilled at atmospheric pressure until no more volatiles came off. The maximum boiling point was 142° C. The viscous liquid remaining was poured into a Teflon ® polytetrafluoroethylene tray where it became semisolid as it cooled. It was then dried overnight under vacuum at 100° C.

EXAMPLE 1

Plasticized polyvinyl butyral sheeting was prepared in an 83 mm twin-screw extractor extruder from polyvinyl butyral flake having a hydroxyl content of 22.5% (as polyvinyl alcohol), 3GH plasticizer (triethylene glycol di (2-ethylbutyrate), and magnesium neo decanoate dissolved in 3GH. The feed ratios were adjusted to give plasticized sheeting containing 44 parts of 3GH per 100 parts of polyvinyl butyral and 0.125 parts of magnesium neo decanoate per 100 parts of polyvinyl butyral. The thickness of the sheeting was 0.031±0.002 in.

The sheeting was conditioned to 0.45% water, and laminates (12×12×⅛-in glass) were made in the conventional manner then tested for impact resistance by the five-lb ball test described in U.S. Pat. No. 3,434,915. The 50% support height was 15.5 ft.

EXAMPLES 2-3 AND COMPARATIVE EXAMPLE A

The procedure of Example 1 was repeated, using feeds adjusted to give 0.10 and 0.15 parts of magnesium neo decanoate per 100 parts of polyvinyl butyral in the plasticized sheeting. In Comparative Example A, no neo decanoate was used. The resulting sheets were laminated with glass and tested with the following results:

| Example | Parts Mg neo decanoate | 50% Support Height, ft |
| --- | --- | --- |
| A | 0 | 9.5 |
| 2 | 0.10 | 12.2 |
| 3 | 0.15 | 17.1 |

COMPARATIVE EXAMPLES B-C

The procedure of Example 1 was repeated, except that magnesium neo decanoate was replaced by magnesium 2-ethylhexanoate calculated to give 0.10 and 0.15 parts magnesium salt per 100 parts of polyvinyl butyral in the plasticized sheeting.

| Comparative Example | Parts Mg 2-ethylhexanoate | 50% Support Height, ft |
| --- | --- | --- |
| B | 0.10 | 11.0 |
| C | 0.15 | 13.0 |

EXAMPLES 4-5

The procedure for Example 1 was repeated except that magnesium neo decanoate was replaced with a zinc neo decanoate commercially obtained from Mooney Chemicals, Inc. as Zinc Ten Cem, 16% zinc. The quantities of this zinc decanoate were adjusted to give 0.08 and 0.10 parts zinc salt per 100 parts of polyvinyl butyral in the plasticized sheeting.

| Example | Parts Zn neo decanoate | 50 % Support Height, ft. |
| --- | --- | --- |
| 4 | 0.08 | 18.5 |
| 5 | 0.10 | 16.5 |

COMPARATIVE EXAMPLE D

The procedure of Example 5 was repeated except that zinc neo decanoate was replaced with zinc 2-ethyhexanoate, also commercially obtained from Mooney Chemical, Inc., as Zinc Hex Cem. 18% zinc. On testing, the laminate exhibited a 50% support height of 14.1 ft.

EXAMPLE 6

The procedure of Example 1 was repeated except that magnesium neo decanoate was replaced with lead neo decanoate commercially obtained from Mooney Chemical, Inc., as Lead Ten Cem, 24% lead. The quantities of this decanoate were adjusted to give 0.09 parts lead salt per 100 parts of polyvinyl butyral in the plasticized sheeting. On testing, the glass laminate exhibited a 50% support height of 16.8 ft.

EXAMPLES 7-9

In Example 7, pieces (14×14×0.032 in) of plasticized polyvinyl butyral sheeting containing no adhesion control additive were immersed in a solution of 0.4 g of magnesium neo decanoate in 200 cc of Hexanes (a mixture of isomers from Fisher Scientific Co.) for one minute at room temperature In Example 8, the procedure of Example 7 was repeated, except that the sheeting was dipped in a 1.4% by weight solution of magnesium neo decanoate in water for one minute at room temperature.

In Example 9, the procedure of Example 7 was repeated, except that the sheeting was dipped in a 1% by weight solution of magnesium neo decanoate in water which contained 0.02% by weight of Duponol® WAQE (35% sodium lauryl sulfate in water) for 18 sec. at room temperature.

All samples were hung to air dry overnight and then conditioned to 0.45% water, laminated with glass and tested with the 5 lb ball test to give the following results.

| Example | 50% Support Height, Ft. |
|---|---|
| 7 | 22 |
| 8 | 24 |
| 9 | 20 |

If the procedure of Example 8 is repeated, using calcium neo decanoate instead of the magnesium neo decanoate, similar results will be obtained.

EXAMPLES 10–12

A roll of plasticized polyvinyl butyral sheeting was passed through a bath containing about 1.5% magnesium neo decanoate and 0.02% of Duponol® WAQE in water at room temperature with an immersion time of 18–20 sec. It was then dried under forced air, powdered with sodium bicarbonate and rewound. Sheeting was subsequently removed from the roll, washed in water to remove the sodium bicarbonate, then conditioned at three different relative humidities to give samples containing 0.2, 0.45 and 0.8% water in Example 10, 11 and 12, respectively. These samples were then laminated and tested as in Example 1 to give the following results in the manner above.

| Sample | % Water | 50% Support Height, Ft. |
|---|---|---|
| 10 | 0.2 | 17.5 |
| 11 | 0.45 | 17.5 |
| 12 | 0.8 | 16.7 |

The washed sheeting contained 0.018 parts magnesium neo decanoate per 100 parts polyvinyl butyral. The laminates made from the sheeting were of low color and excellent clarity.

EXAMPLES 13–15

A solution of magnesium neo decanoate was prepared by adding 1.07 lbs. of magnesium hydroxide and 5.23 lbs. of neo decanoate acid to 380 lbs. of water in a stainless steel drum fitted with an agitator and a metal coil for heating and cooling. The mixture was heated to 95° C. for three hours with good agitation then cooled to 25° C. Water was added to make up for that lost by evaporation, and 0.1 lb. (0.025%) of Triton X-305 was added. The mixture was filtered through fluted filter paper. The solution contained 780 ppm magnesium or 1.18% by weight of magnesium neo decanoate.

The solution was placed in a tank and heated to 50° C. A roll of plasticized polyvinyl butyral sheeting was then passed through the solution as in Example 10 with an immersion time of five seconds. It was similarly dried, powdered with sodium bicarbonate and rewound. Sheeting was subsequently removed from the roll, washed and then conditioned to give samples containing 0.2, 0.45 and 0.8% water in Examples 13, 14 and 15 respectively. These were then laminated and tested as in Example 1 to give the following results:

| Sample | % Water | 50% Support Height, Ft. |
|---|---|---|
| 13 | 0.2 | 12.5 |
| 14 | 0.45 | 18.3 |
| 15 | 0.8 | 16.3 |

The sheeting was clear and of low color.

COMPARATIVE Example E

To a solution of 42.09 g (0.75 moles) of potassium hydroxide in 135 g of water was slowly added 129.15 g (0.75 moles) of neo decanoic acid with stirring. The pH of the solution was 8.95.

Plasticized polyvinyl butyral sheeting was then prepared as in Example 1 except that the aqueous solution of potassium neo decanoate prepared above was used in place of the solution of magnesium neo decanoate. The feed ratios were adjusted to give sheeting containing 46 parts of 3GH plasticizer and 0.22 parts of potassium neo decanoate per hundred parts of polyvinyl butyral. Laminates made with this sheeting had a 50% support height of only 9.7 ft.

EXAMPLES 16–18 AND COMPARATIVE EXAMPLES F–T

Aqueous solutions of a group of magnesium, calcium and zinc salts were prepared by mixing 0.06 moles of the organic acid with 0.033 moles of either magnesium hydroxide, calcium hydroxide or zinc oxide in 780 g of water, then heating the mixture to the reflux temperature with stirring for three hours followed by cooling to room temperature and filtering. A magnesium stearate solution was prepared by heating excess commercial magnesium stearate in water with stirring for four hours followed by cooling and filtering. The metal content of each solution was estimated by atomic absorption.

Pieces (4"×6") of 30-mil polyvinyl butyral sheeting containing 44 parts of 3GH plasticizer/100 parts of resin but containing no adhesion control additive were dipped in each of the solutions for 18 seconds at room temperature, then drained and air dried. One-half of each piece was then powdered with sodium bicarbonate and left overnight. The powdered piece was then washed with water, air dried and then conditioned with the unpowdered piece for a day at 22% relative humidity and 72° F.

The sheeting was then adhered to glass (103 mil float glass which had been previously washed in hot, aqueous trisodium phosphate solution, then rinsed with demineralized water and dried) by preparing a sandwich of glass, polyvinyl butyral sheeting, 5-mil Mylar® polyester film and glass, then heating this to 135° C. in a press for 30 minutes at a pressure of 15 psi. The assembly was then cooled and the glass next to the Mylar® film and the Mylar® film were removed. The glass/polyvinyl butyral laminate was then conditioned at 22% relative humidity and 72° F. for four days.

The sheeting was then cut into strips ¼" wide and the force required to peel the strips at a nominal peel rate of 40 cm/sec and a nominal peel angle of 40° was determined on a highspeed peel tester. The sum of four values was taken to give the peel force in lb/lineal in. Results are given in the following Table.

Separate tests with both experimental and commercial polyvinyl butyral sheeting showed that in this test optimum adhesion for a combination of high mean support height and good retention of glass fragments is about 20 lb/in. Laminates made with polyvinyl butyral sheeting containing no adhesion control additives typically give values of 40–50 lb/in.

| Example | Salt | ppm Metal in Solution | Peel Force (lb/in) Unpowdered | Peel Force (lb/in) Powdered |
|---|---|---|---|---|
| F | Mg Acetate | 901 | 51.7 | 55.4 |
| G | Mg Propionate | 870 | 46.9 | 51.5 |
| H | Mg Pivalate | 807 | 38.7 | 46.7 |
| I | Mg 2-EB* | 854 | 41.1 | 45.5 |
| J | Mg 2-EH** | 846 | 22.2 | 30.6 |
| K | Mg n-Octanoate | 823 | 2.8 | 6.4 |
| L | Mg n-Nonanoate | 218 | 30.8 | 37.0 |
| M | Mg n-Decanoate | 77 | 39.4 | 45.3 |
| 16 | Mg neo-Decanoate | 792 | 12.6 | 18.2 |
| N | Mg Laurate | 12 | 56.9 | 56.2 |
| O | Mg Stearate | 2.7 | 44.4 | 40.0 |
| P | Mg Perfluoro-octanoate | 2000*** | 39.0 | 14.4 |
| Q | Ca 2-EB | 1643 | 39.3 | 51.0 |
| R | Ca 2-EH | 1571 | 30.6 | 48.0 |
| 17 | Ca neo-Decanoate | 786 | 30.6 | 35.8 |
| S | Zn 2-EB | 2000 | 43.9 | 48.5 |
| T | Zn 2-EH | 574 | 45.8 | 43.7 |
| 18 | Zn neo-Decanoate | 64 | 49.4 | 49.5 |

*2-EB = 2-Ethyl Butyrate
**2-EH = 2-Ethyl Hexanoate
***Estimated

I claim:

1. In the process for the preparation of a plasticized polyvinyl butyral sheeting suitable for use in safety glass laminates, the improvement which comprises immersing the polyvinyl butyral sheeting in a solution of divalent metal salt of neo decanoic acid wherein the metal is magnesium or calcium wherein the amount of said neo decanoic acid salt incorporated into the polyvinyl butyral is about from 0.01–0.5 wt. percent based on plasticized polyvinyl butyral.

2. A process of claim 1, wherein the solution further comprises about from 0.01–1.0% by weight of non-ionic or anionic surfactant.

3. In the process for the preparation of sheeting suitable for use in safety glass laminates by extruding a blend of polyvinyl butyral and plasticizer in the form of a sheet, the improvement which comprises incorporating into the blend prior to extrusion about from 0.01–0.5 weight percent of a divalent metal salt of neo decanoic acid wherein the metal is zinc, magnesium, calcium or lead.

* * * * *